Patented Oct. 11, 1932

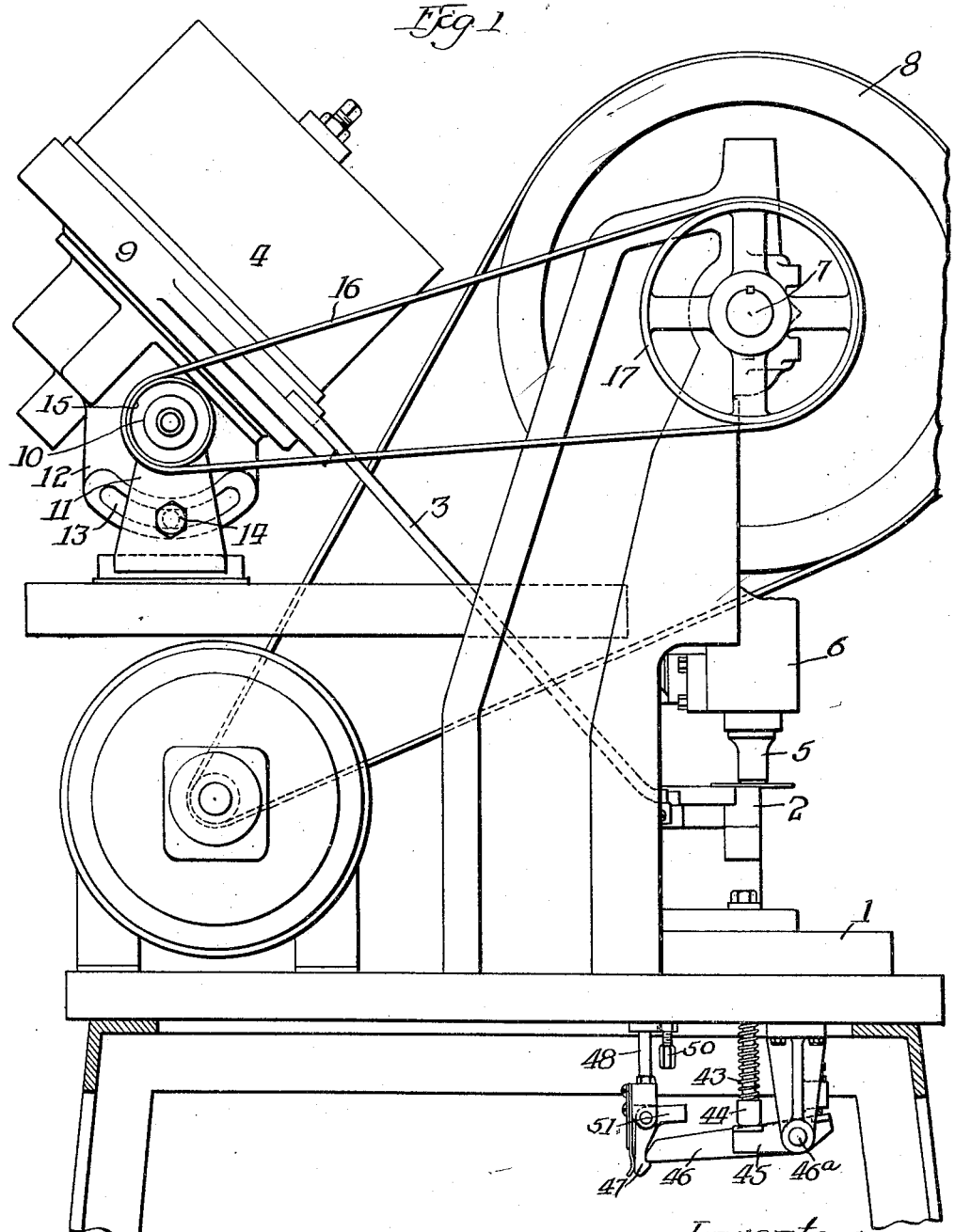

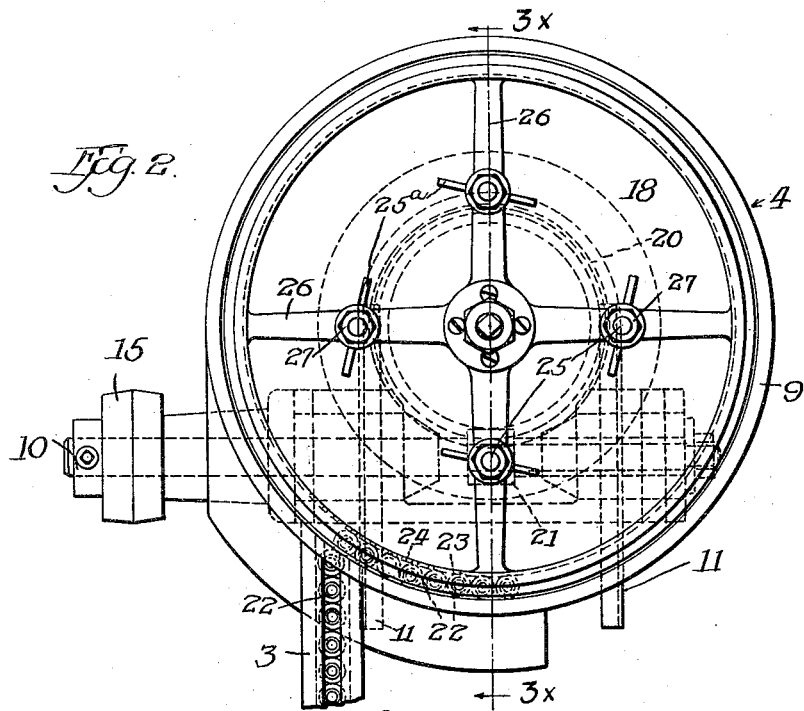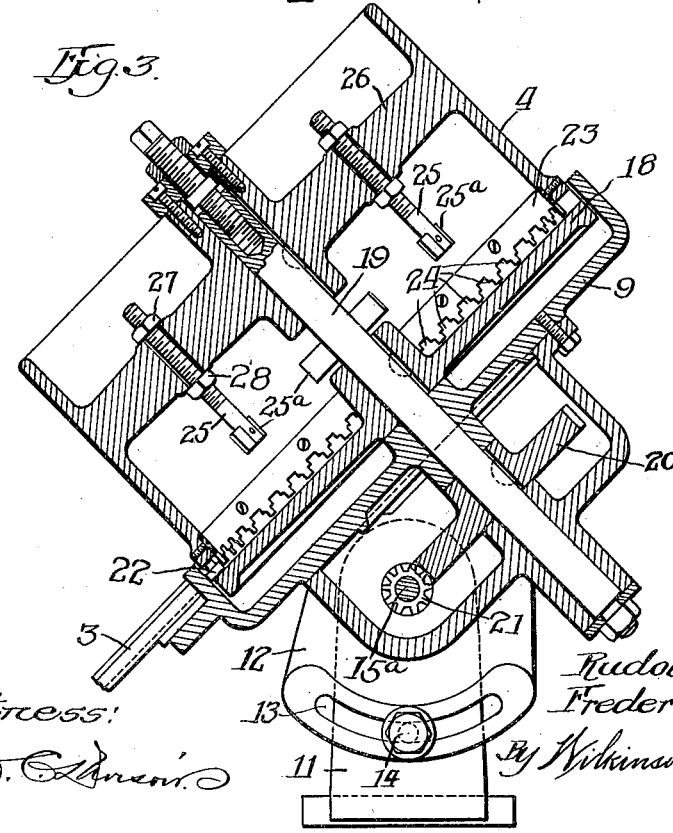

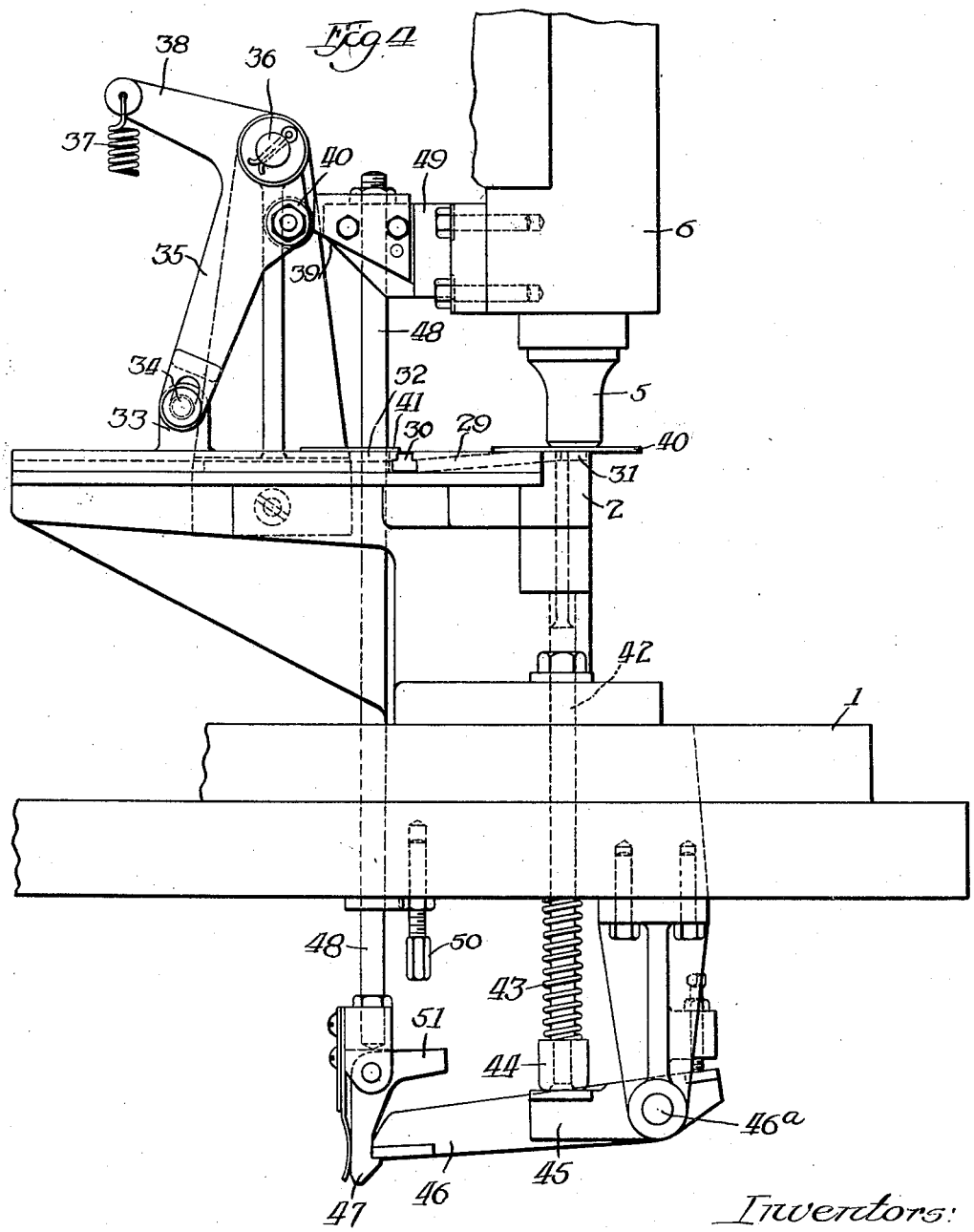

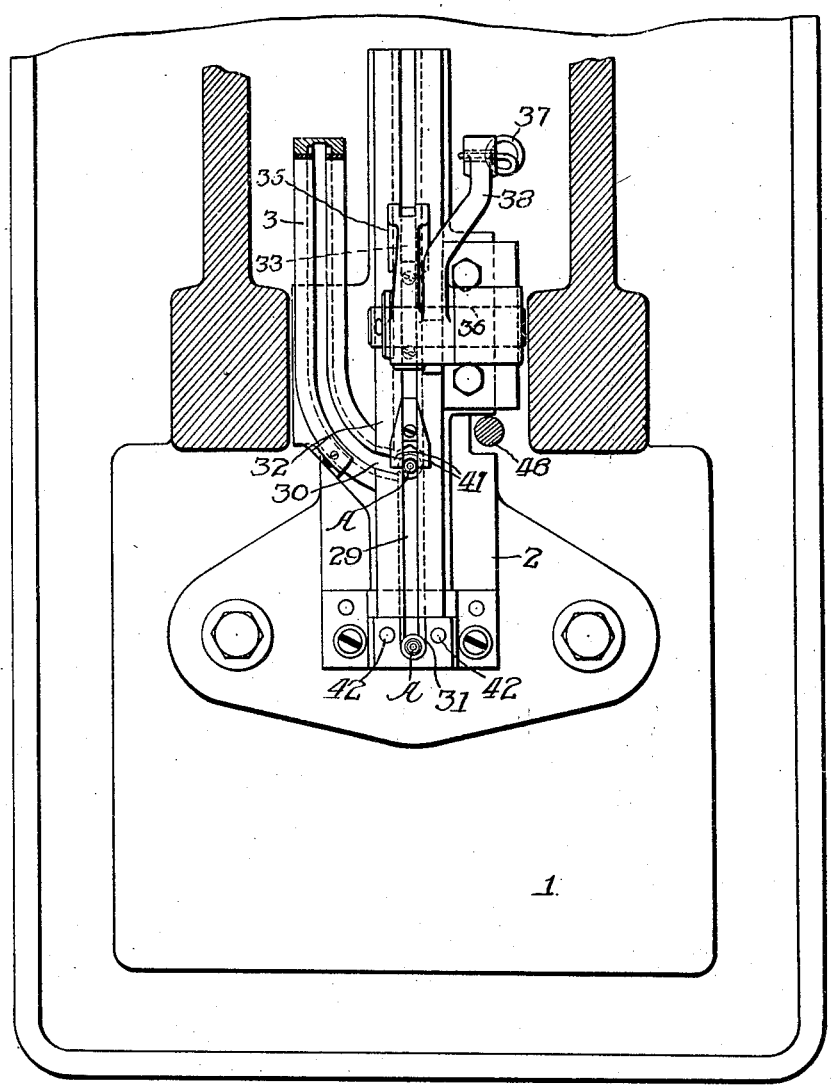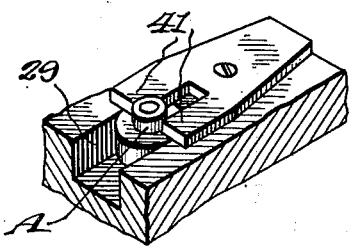

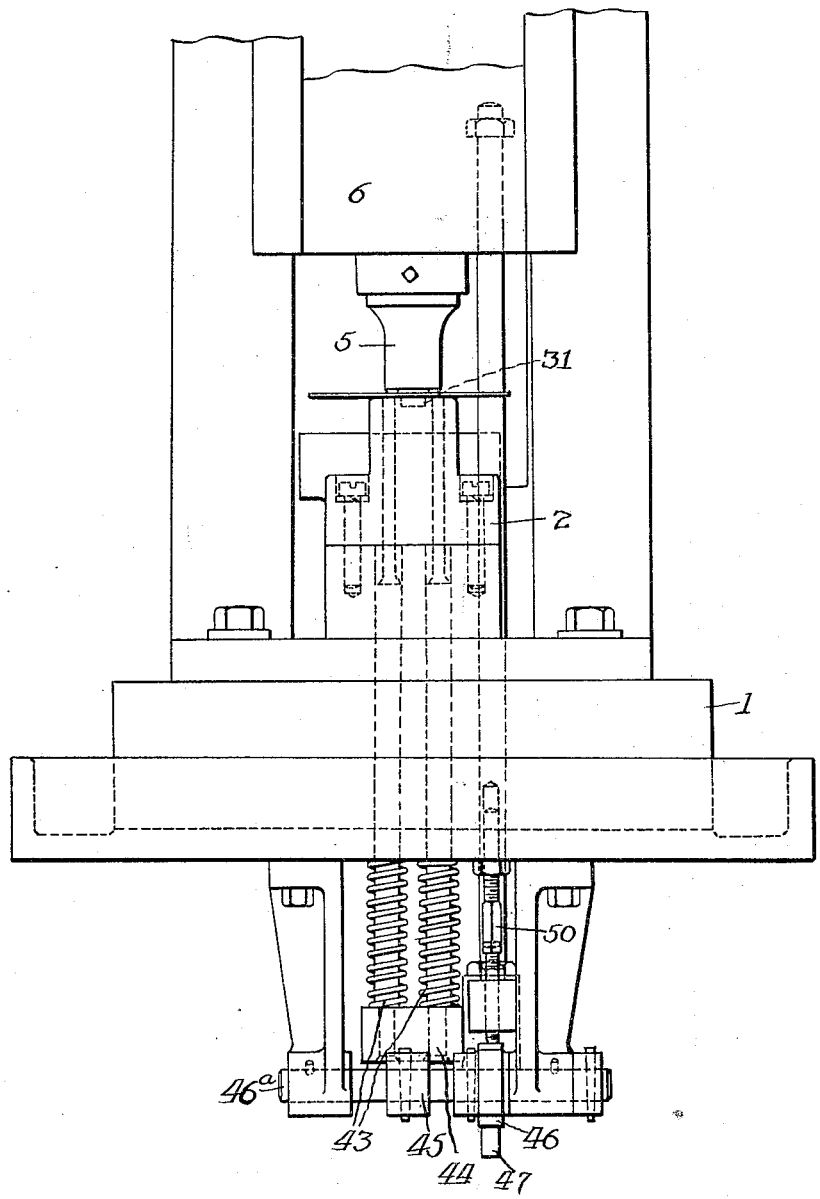

1,882,197

UNITED STATES PATENT OFFICE

RUDOLPH A. SKRIBA AND FREDERICK J. LITTELL, OF CHICAGO, ILLINOIS, ASSIGNORS TO F. J. LITTELL MACHINE COMPANY, OF CHICAGO, ILLINOIS, A CORPORATION OF ILLINOIS

AUTOMATIC FEED FOR ASSEMBLING PRESSES

Application filed August 17, 1928. Serial No. 300,240.

This invention relates to means for automatically selecting nuts or similar workpieces from an appropriate hopper or container in which they are placed in bulk, and feeding them in accurately predetermined presentation, one by one, to a punch press or machine in which they are to be used, in cadence with the operative strokes of the press, and in a position which will enable each workpiece to enter an opening in a structural member held to receive the piece as a step preliminary to being permanently secured in the structural member by the ordinary operation of the press.

One object of the invention is to present the workpieces at the point of discharge of the hopper, hereinafter referred to as the gate, not only with sufficient frequency to insure an ample supply of the pieces within reach of the press, so that a piece will be available to the press each time the latter functions, but present the pieces with their ends which are to enter the structural member located in the proper direction for insertion into said member. To this end, one part of the invention proceeds upon the principle of providing a gate in the hopper through which the workpieces may escape one at a time, and guarding this gate by a rotary strainer or selector constructed with a series of characteristic openings appropriate to the design of the pieces and in such positions that the openings will pass only those workpieces which rest with their entering ends presented in the desired direction, for instance, those pieces which rest upon their ends of greater dimension and present their ends of lesser dimension upward; the selector being made movable, for instance by making it in annular form and causing it to rotate with the hopper, so that the pieces, by tumbling in the hopper, will insure an ample supply of pieces to pass through the openings; and the selector being so related to a surrounding wall of the hopper, preferably a stationary wall in which the gate is formed, that it will leave between the selector and said wall, an annular runway suitable for maintaining a provisional train of workpieces which, by the rotation of the hopper, will constantly file past the hopper gate and deliver a piece through said gate whenever the gate is cleared by the onward movement of a previously entering piece; travel of the provisional train of workpieces being imparted by having the bottom of the entraining space move with the hopper and selector; escape from the entraining space through the gate being influenced by gravity; and the hopper as a whole being tilted to induce gravitation through the gate as well as flow of its contained bulk of pieces toward the selector; the arrangement being such that the pieces rest their flat faces upon their rotating support and slide or roll through cylindrical faces against the stationary confine of the entraining space provided by the wall in which the gate is formed; and the angle of inclination of the hopper being preferably adjustable so that the proportion of the weight of the workpieces borne by the revolving and stationary walls, respectively, as well as the force of gravitation through the gate, may be regulated to suit various designs of workpiece.

Another object is to provide means for automatically supplying the workpieces to the press or machine in which they are to be used, one by one, in position to facilitate their insertion into the structural member and to expose the pieces to the upsetting, riveting, or other fixing stroke of the press; and to this end, another feature of the invention consists in feeding the pieces in column from the gate of the hopper to a reciprocating press charger in a manner to cause the leading piece of the column to enter the path of the charger after each return stroke of the charger, for instance, by having the pieces reach an inlet port in the charging channel at such an angle to the charger that the column is first arrested by the entrance of the leading piece of the column, and thereafter interrupted by the forwardly moving charger until the charger uncovers the port on its return movement and admits another piece.

Another object of the invention is to provide an efficient charger for the purpose stated, and one which, while retraced by the working stroke of the press, and thereby positively prevented from obstructing the descending press plunger, will be released to perform a spring energized charging stroke as the plunger retires upwardly, so that the charger can position the piece over the press anvil early in the upstroke of the press, can remain at its forward limit in embrace of the piece to steady the same while the hole in the structural member is being shifted over the piece and into registry with its entering end, and will be withdrawn from the piece only after the structural member has entered into engagement with the inserted end just before the next downward stroke of the plunger; the preferred embodiment of this part of the invention including a sliding charger having a recessed forward end which enters into embrace with the workpiece, at least to the extent of holding down the workpiece and preventing it from bouncing upward at the end of the charging stroke, or being otherwise displaced from the anvil by the shifting of the structural member; also an inclined charging channel which, while attaining an elevation at its forward end which leaves the piece over the anvil protruding upwardly as a feeler for the hole that it is to enter, will nevertheless have its rear end sufficiently low to leave the succeeding piece, as it enters in front of the charger, at a level well below the surface which supports the structural member during its manipulation, thereby avoiding any limitation of manipulation of the structural member in bringing its several openings into registry with the entering ends of the workpieces as the latter successively arrive in position over the anvil.

Another object is to provide means whereby the structural member, immediately upon completion of the clinching stroke of the press, will be automatically and positively displaced from the path of the ensuing nut or piece independently of any voluntary act of the operator; and to this end, another feature of the invention consists in providing, adjacent the anvil, one or more lifters, preferably a pair, symmetrically disposed on opposite sides of the anvil, and having these lifters actuated in synchronism with the upstroke of the plunger, and preferably the first part of the upstroke; the lifters, however, being released and automatically retired downward as soon as they have displaced the structural member sufficiently to clear the charging channel for the succeeding nut or work-piece; the means for realizing this part of the invention comprising preferably one or more vertically movable rods terminating adjacent the working plane of the press, normally spring retracted, but arranged in the path of a lifting lever which in turn enters the path of a grab hook on a rod depending from the press plunger, and which hook, on its upward movement, encounters a gripping stop that causes it to release the lifting lever as soon as the new nut has had time to reach the anvil.

While the body of material into which the workpieces are inserted is herein referred to as a structural member, and while the workpiece selected to illustrate the invention is a nut mounted in such member by upsetting its inserted end, it is to be understood that these specific applications are merely illustrative, and that the invention is applicable to the feeding of rivets, bushings, grommets, and many other forms of workpieces to any piece of material which can by manipulation be brought into position to receive them.

In the accompanying drawings in which the preferred embodiment of the invention is shown by way of illustration—

Figure 1 is a side elevation of a nut feeder constructed in accordance with the invention, together with those parts of the punch press with which the feeder is immediately concerned.

Figures 2 and 3 are views on an enlarged scale showing the hopper, Figure 2 being a view looking into the upper open end of the hopper, and Figure 3 a vertical axial section on the line 3x—3x of Figure 2.

Figure 4 is a detail view in the same direction as Figure 1, but on the scale of Figures 2 and 3, showing the press charger and the work lifter in side elevation.

Figure 5 is a detail view on the scale of Figures 2 to 4, showing portions of the press frame in horizontal section and the press table and charger in plan.

Figure 6 is a detail view on the scale of Figures 2 to 5, showing the work lifter in front elevation.

Figure 7 is a perspective view showing engagement of the work piece by holddown lips on the charger.

Referring more particularly to Figure 1, 1 represents the bed of the press, 2 an anvil or platen supported thereon, 3 a chute for delivering to the anvil 2, work pieces that are to be riveted; and 4 represents a hopper adapted to supply the work pieces entrain to said chute. 5 represents a riveting die carried by the plunger 6 of the press, which is moved vertically in the conventional way, for instance, by means of a shaft 7 having a drive wheel 8.

9 represents a hopper base upon which hopper 4 is stationarily mounted, said base being supported with angular adjustment, to vary the gravitation of the work pieces, in a vertical plane parallel with the plane of the chute 3 by mounting the hopper base upon the spindle 10 carried by the bracket 11, the hopper base being fixed at any select angle of adjustment through means of segment plate 12 with its concentric slot 13, and the bolt 14 which passes through the slot and bracket. 15 represents a drive wheel for the rotating elements of the hopper, connected by belt 16 with pulley 17 on the shaft 7.

As shown in Figures 2 and 3, hopper 4 contains a separately formed bottom 18 fixed to the rotating shaft 19 which is driven through suitable connection such as gear wheels 20 and 21, from the shaft 15—A of pulley 15 with the effect of keeping the work pieces stirred up or agitated; this agitation being the result of the surface travel of the bottom 18 plus the gravitation of the work pieces toward the low side of the hopper. 22 indicates the gate through which the work pieces escape from the hopper into the chute 3, the work pieces being carried constantly to or past this gate, entrain, by the marginal portion of the rotating bottom 18, upon which the work pieces rest. But in order that only certain pieces may enter the annular train, a selector 23 is secured to the stationary wall 4 of the hopper with a series of openings 24 presented in such position that only those work pieces can escape and become a part of the marginal train, which happen to be resting right side up. That is to say, the openings 24 are designed to correspond with the profile common to all of the work pieces and thereby act as a barrier to the passage of work pieces which may be traveling upon the smaller end but by constant presentation of numerous openings to work pieces which are in proper position, insuring an ample supply of the work pieces in the marginal train which is constantly moving toward or past the gate 22. By this operation, the chute 3 will be kept filled with work pieces so that the column is constantly gravitating toward the automatic feed (to be described) which leads to the anvil 2; the length of the chute 3 in relation to the diameter of the work pieces being such that a complete column will fill the chute to such a point that the constantly traveling annular train will pass the chute whenever it is full or drop one or more work pieces into the chute to fill in space that may be left at its upper end.

25 indicates agitators depending from spider arms 26 of the fixed wall of the hopper 4, with vertical adjustment to determine their intrusion into the mass of work pieces; lower ends of the agitators being equipped with plates 25—A which may be given any desired angle of presentation to the revolving mass of work pieces, by the adjusting means, namely, clamping nuts 27, 28 on the shanks of the agitators, impinging above and below the spider arms 26. To transfer work pieces from the delivery end of chute 3 to the anvil 2, said anvil, as shown more clearly in Figures 4 and 5, is provided with a slideway 29 leading from a lateral intake port 30 with which the chute 3 connects, to the seat 31 in the anvil 2; and in this slideway 29, with a stroke starting immediately in rear of the intake port 30, is a charger 32 of special design, which advances the work pieces individually to the anvil in advance of each descending stroke of the heading or riveting die 5, the charger being automatically withdrawn to a position which admits a succeeding work piece by each descending stroke of the press. To impart the timed advancing and receding movements to the charger, as indicated, the charger is provided with an upstanding lug 33 having slot and pin connection 34 with the downwardly presented arm of the bell crank lever 35, which is fulcrumed at 36 and moved normally in direction to advance the charger, by means of a spring 37 extending from the rearwardly presented arm 38 of said lever to some convenient fixed point of anchorage; said lever 35 being retracted, in opposition to the spring 37 and in the downward stroke of the press, by means of a cam 39 co-acting with the antifriction roller 40 on the lever. Thus with each upward stroke of the press, lever 35 is released by the cam 39 so that its lower end swings forward under the influence of spring 37 engaging a work piece that has entered through the port 30, and advancing it to the seat 31. Seat 31 is so designed that it arrests the work piece at the end of the forward movement of the charger, confines the work piece against lateral displacement and supports the work piece with its riveting end above the level of table 40 so that the structural member with which the work piece is to be riveted can have the appropriate punch hole or opening brought into registry with the riveting end of the work-piece in advance of the descent of the press; and slideway 29 is inclined downwardly toward the rear from the anvil or seat 31 so that while charger 32 will travel in a horizontal plane the next ensuing work-piece standing in the path of the charger and awaiting advancement to the anvil, will not protrude above the plane of the table 40 where it might obstruct the free sliding movement of the structural member over the table 40, in bringing such of its holes into registry with the rivet on the anvil. A desirable feature in the design of the charger 32 is a pair of hold-down lips 41, which overlap the shoulder of the work-piece (shown at "A" in Figure 5) when the latter reaches its forward limit where it has moved out from beneath the overhanging walls of the T shaped slideway. By this means work-piece "A" is prevented from bounding out of the slideway at the end of its move or being displaced by the striking of the structural member against it, in the step of bringing the hole in the structural member into registry with the upstanding riveting end of the work-piece. This part of the operation comprises horizontal shifting of the structural member until the hole drops over the protruding riveting end of the work-piece, while the work-piece is being held steady by the charger, and then the descent of the press plunger, in response to the usual pedal release to head the rivet in the structural member, which descent, by the operation of the cam 39, withdraws the charger so that the rivet may be set tightly in the structural member.

Inasmuch as the machine automatically advances a new work-piece to the anvil upon the upstroke of the machine, it becomes important to get the structural member which is being manually manipulated, out of the path of the succeeding workpiece. To this end displacing rods 42, the relative location of which on either side of the seat 31 is indicated in Figure 5, are mounted for vertical movement and given a momentary upward impulse at the beginning of the upstroke of the press. As shown in Figures 4 and 6, these displacing rods 42, are held normally downward by compression springs 43, but are connected by a crosshead 44, located in the path of the rocker-arm 45 fulcrumed on shaft 46a, which is rocked and caused to move the arm upwardly, through means of lever 46 also on said shaft 46a; said lever being engaged by means of a tripping finger 47 on the lower end of a connecting rod 48 which depends from some suitable portion of the press plunger, for instance, the bracket 49. These elements together with a tripping stop 50 in the path of the arm 51 of finger 47, constitute self-releasing lifting mechanism moving momentarily upward sufficiently to displace the structural member, with the now riveted work-piece, from the path of the incoming new work-piece, while the charger 32 is still being restrained by the cam 39.

We claim:

1. In an assembling press, an anvil upon which work pieces are supported during assembly, a vertically reciprocating plunger, a charger for advancing said work pieces to said anvil, means automatically moving the charger in timed relation to the working strokes of the plunger, and means automatically displacing the structural member after completion of the assembly; the last named means comprising a displacing rod with lifting connections between the displacing rod and the plunger.

2. In an assembling press, an anvil upon which work pieces are supported during assembly, a vertically reciprocating plunger, a charger for advancing said work pieces to said anvil, means automatically moving the charger in timed relation to the working strokes of the plunger, and means automatically displacing the structural member after completion of the assembly; the last named means comprising a displacing rod with lifting connections between the displacing rod and the plunger, comprising a rocker arm, engaging the displacing rod, a lifting rod adapted to impart movement to said rocker arm and which is in turn connected to said plunger, and a releasable pick-up connection between the lifting rod and the rocker arm.

Signed at Chicago, Illinois, this 11th day of August, 1928.

RUDOLPH A. SKRIBA.
FREDERICK J. LITTELL.